Dec. 20, 1960
V. L. BRANT
2,965,558
PROCESS FOR TREATING ACID SLUDGE
Filed Aug. 14, 1957
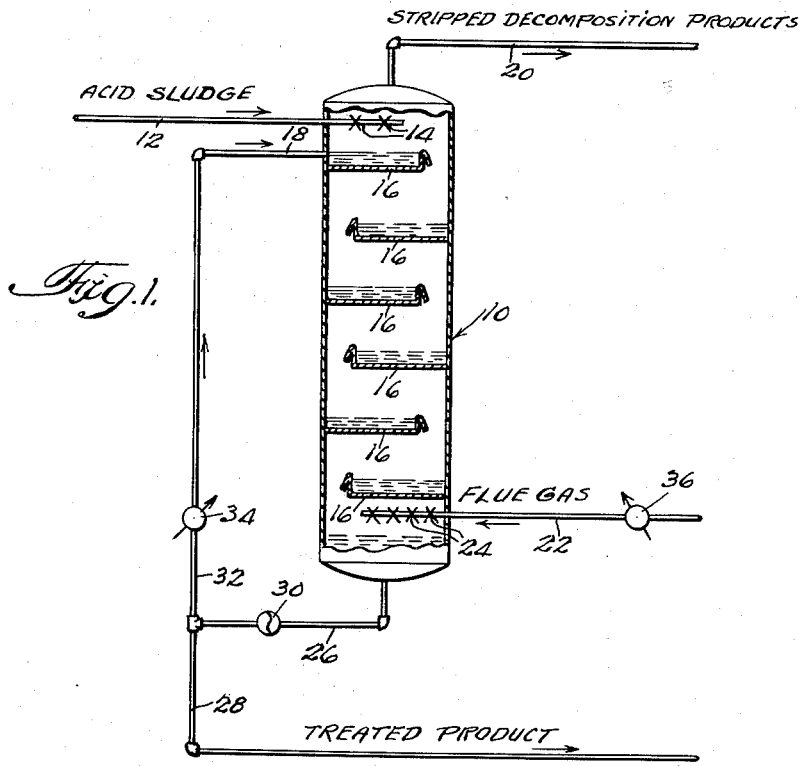
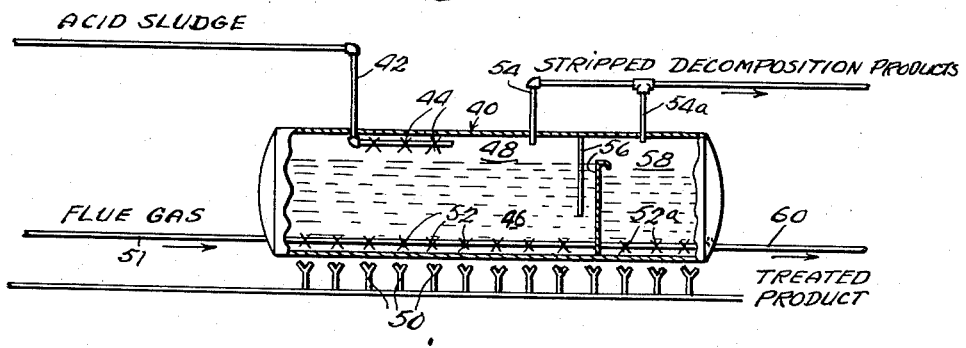
Inventor:
Victor L. Brant.
By Olsen, Mecklenburger, van Holst,
Pendleton & Neuman.
Attys.

United States Patent Office 2,965,558
Patented Dec. 20, 1960

2,965,558

PROCESS FOR TREATING ACID SLUDGE

Victor L. Brant, Tulsa, Okla., assignor to D-X Sunray Oil Company, Tulsa, Okla., a corporation of Delaware Filed Aug. 14, 1957, Ser. No. 678,166

13 Claims. (Cl. 208—13)

The present invention relates to a process for treating acid sludge and, more particularly, pertains to a process whereby the acid sludge may be utilized profitably in the course of disposing of the same.

The treatment of hydrocarbon oils with sulfuric acid to remove undesirable components, such as sulfur-containing compounds, asphaltenes, etc., and improve the oil properties is well known. The treatment usually consists in the intimate admixture of the oil and the sulfuric acid by countercurrent engagement, blowing the mixture with air, etc. The resulting mixture is then allowed to settle under proper temperature and pressure conditions so that two or three phases are formed. The top layer comprises the desired hydrocarbon product and usually contains oil-soluble petroleum sulfonic acids. This layer may be processed further if desired. The bottom phase or phases contains substantially all of the acid and is referred to as acid sludge. The sludge, in addition to the spent sulfuric acid, contains varying amounts of organic impurities.

Heretofore, the sludges have been treated and disposed of by several methods, some of which are: (1) Burning as fuel without further processing, or burning the sludge as fuel with intermediate processing, such as settling, to remove a portion of the acid; (2) neutralizing the sludge with ammonia or other reactants and burning as such, or the neutralized sludge may be further processed to produce an aqueous layer containing chemicals and a hydrocarbon layer which can be burned as fuel, or again further processed as a residual oil, such as feed for coking, cracking, etc.; and (3) hydrolyzing the sludge to produce an aqueous layer of dilute acid and a hydrocarbon layer which can then be disposed of as fuel or further processed as a residual oil.

The hydrocarbon layer resulting from any of the above methods is a poor, low grade fuel. When the sludge is settled at suitable temperatures and pressures before burning, an acid layer separates which may be recovered and disposed of as a fertilizer grade acid; however, a considerable portion of the acid will still remain in the hydrocarbon making it undesirable for further processing as a residual oil. In the process wherein the sludge is neutralized with chemicals, the aqueous layer has to be disposed of and the hydrocarbon layer will contain products of neutralization which are undesirable. Hydrolyzing the sludge produces a large quantity of dilute acid which presents a disposal problem and also produces a hydrocarbon layer which still contains considerable quantities of strong acid which will present equipment corrosion problems upon further processing.

It is thus apparent that the acid sludge, in view of the many chemically and physically entrained impurities, is prevented from being used for any useful purpose. Also, the sludge, if initially viscous, ages rapidly into a hard polymerized mass. The sludge presents a serious disposal problem. Previous attempts to recover acid and hydrocarbon values contained therein have been unsuccessful since yields of desired elements were extremely low and the corrosive nature of the sludge attacked ordinary equipment utilized for purposes of recovery.

It is an object of this invention, therefore, to provide an efficient, continuous process for the processing of acid sludge whereby it may be readily disposed of.

It is another object of this invention to provide a process for treating acid sludge which not only enables the sludge to be efficiently disposed of, but, in addition, renders the treated sludge suitable for a number of useful purposes.

It is a further object of this invention to provide a method for treating acid sludge whereby ordinary equipment is able to process corrosive acid sludge without damage.

It is yet another object of this invention to provide a process for treating acid sludge which is flexible enough to efficiently handle acid sludges of varying acid content.

The above and other objects of this invention will become more apparent from the following description when read in the light of the accompanying drawing and appended claims.

In one embodiment of this invention acid sludge is fed into the top pan of a reactor-stripper. Heat is supplied to the reactor interior by cycling a hot noncorrosive hydrocarbon oil to the top pan of the reactor. The hot oil contacts the incoming acid sludge, and reacts therewith thereby rapidly decomposing the strong sulfuric acid contained therein. The hydrocarbon then spills downwardly from pan to pan while being stripped of acid decomposition products by a stripping gas flowing upwardly through the reactor, countercurrently to the descending hydrocarbon stream.

For a more complete understanding of this invention reference should now be made to the drawing, wherein Figure 1 is a flow sheet of one embodiment of the provided process which may be employed in the course of treating acid sludge; and Fig. 2 is a flow sheet of a modified process which may be employed in the treating of acid sludge.

As has been above mentioned, the treating of hydrocarbon oils with strong acids to enhance the properties of the treated oil is a well-known process in the petroleum industry. The acid sludge resulting from such treatment may be processed by utilization of the methods depicted schematically in Figs 1 and 2.

Referring now more particularly to Fig. 1, a stripper-reactor 10 is schematically illustrated having an inlet line 12 which enables the acid sludge to be treated to enter the top of the reactor 10 and be sprayed downwardly thereinto by means of spray members 14. The reactor 10 contains a number of superposed trays or pan members 16 which are adapted to successively receive the sludge being treated and entering into the interior of the reactor by means of the sprays 14. A noncorrosive oil also enters the top of the stripper-reactor 10 by means of the inlet feed line 18. It will be noted from Fig. 1 that the noncorrosive oil enters directly into the uppermost reactor pan 16 disposed beneath sprays 14 which discharge the acid sludge being processed into the reactor interior.

It is well known in the petroleum art that sulfuric acid when heated in the presence of a hydrocarbon will react with the hydrocarbon and decompose into water and sulfur dioxide. This latter decomposition reaction increases in speed with temperature; the rate of decomposition becomes very rapid above 400° F. at substantially atmospheric pressures. It is intended, therefore, that the acid sludge being processed engages a relatively larger volume of noncorrosive hydrocarbon oil in a temperature range of between 400 and 600° F. and preferably at 450° F. Although superatmospheric pressure may be utilized in the course of the decomposition reaction, since an increase in pressure requires an accompanying increase in temperature, it is preferred that the decomposition reaction of the provided process be effected at substantially atmospheric pressures so that a lower temperature may be employed.

As has been above stated, the incoming acid sludge entering the stripper-reactor 10 is sprayed into the uppermost pan 16 which contains a large volume of the noncorrosive hydrocarbon oil relative to the incoming sludge. Since the equilibrium temperature in the upper pan 16 and in the stripper-reactor 10 is approximately 450° under preferred operating conditions, the sulfuric acid content of the incoming acid sludge is substantially immediately decomposed into water and sulfur dioxide, in accordance with the previously mentioned reaction. Since the provided process is intended to be carried out in a continuous manner, the incoming sludge and noncorrosive oil continuously enter and spill over the rim of the uppermost pan 16. A stripper gas may be employed for purposes of removing the sulfur dioxide from the stripper-reactor and withdrawing the same through the overhead line 20. The latter line is illustrated in fluid communication with the upper end limit of the reactor 10. The stripper gas enters the bottom portion of the stripper-reactor 10 by means of the inlet line 22 and may emerge downwardly through nozzles 24 or other equivalent means.

It is thus seen that the incoming sludge enters the reactor 10 and is sprayed or continuously allowed to flow into a pan containing a relatively larger volume of a noncorrosive hydrocarbon oil maintained at an elevated temperature of approximately 450° F. Because of the substantially instantaneous decomposition of the sulfuric acid content of the acid sludge, corrosion problems are avoided since the sulfuric acid values are never allowed to remain in the stripper-reactor for a time sufficient to attack the pan or reactor walls. The acid sludge and noncorrosive oil mixture from which sulfuric acid values have been removed continuously flow downwardly by cascading from pan to pan, and in the course of this latter flow counter-currently engage rising stripping gas which removes the sulfuric acid decomposition products through an overhead line 20.

It is desirable to produce the necessary heat of decomposition for the sulfuric acid values in the acid sludge by heating the noncorrosive hydrocarbon oil prior to introduction into the reactor. Consequently, the sulfuric acid values in the sludge will be substantially instantaneously destroyed upon contacting the noncorrosive oil and thereby prevented from attacking the stripper-reactor components. In the flow sheet of Fig. 1, it will be noted that the treated acid sludge which leaves the bottom of the stripper-reactor 10 by means of line 26 is a noncorrosive hydrocarbon oil which may be sent to storage through line 28. Another portion may be recycled by means of pump 30 and line 32 to a heat exchanger 34 which will reheat the recycled noncorrosive oil to a desired temperature. The latter temperature is sufficient to assure the substantially instantaneous decomposition of the sulfuric acid values as the acid sludge entering the reactor through sprays 14 contacts the noncorrosive recycled oil in uppermost pan 16.

It is conceivable that other means may be employed for supplying the necessary heat input into the provided process for decomposing the sulfuric acid values of the acid sludge. It is conceivable, for instance, that the stripping gas may be a direct combustion product or may be heated by means of heat exchanger 36 prior to entering the stripper reactor 10. The hot gases rising counter-current to the downflowing hydrocarbon oil would transfer heat to the hydrocarbon oil which would then be recycled to the top tray. It is only important that the temperature of the relatively large body of oil on the top tray be maintained at the desired reaction temperature. Another conceivable example would embody the use of a combustion burner above the oil or submerged in the oil at the base of the stripper-reactor. In this manner, the combustion would heat the oil which would then be recycled to the top tray. There are limitations on the method of heating due to the corrosive and fouling nature of the sludge. It would not be practical, for instance, to heat the sludge in furnace tubes of ordinary metallic construction. Also, it would not be practical to heat the sludge by heat exchange using ordinary construction methods. The unique feature is the concentration of heat in a large body of oil at the point of entrance of the acid sludge and thereby decomposing the strong acid rapidly before it is allowed to attack the ordinary metals of construction.

A working example of a continuous process utilizing that process and apparatus schematically illustrated in Fig. 1 is as follows: Thirty barrels per hour of acid sludge is introduced into the stripper-reactor through line 12 at a temperature of 180° F. A noncorrosive hydrocarbon oil simultaneously enters the reactor through line 18 at a rate of 180 barrels per hour and at a temperature of 550° F. The equilibrium temperature resulting in the reactor interior is the preferred temperature of 450° F. The flue gas entering through line 22 passes upwardly at a rate of 10,000 standard cubic feet per hour through the reactor 10 removing the decomposition products of the sulfuric acid. The acid sludge passes through the reactor 10 in approximately six minutes time and emerges through the outlet line 26 devoid of strong acid and possessing less than .1 percent of residual weak acid.

The specific stripping gas employed is dependent upon the use which is to be made of the decomposition products of the residual oil and/or the decomposition products of the sulfuric acid. Consequently, if the residual oil flowing through the reactor outlet line 26 is to be used as a coker charge, it is obvious that the viscosity of the product be maintained as low as possible. As a result, an inert gas such as steam, flue gas or nitrogen will be employed as the stripping agent. If the hydrocarbon produced from the flow sheet illustrated in Fig. 1 is to be utilized as an asphaltic material, air may be employed as a more desirable stripping agent. If the decomposition product cannot be exhausted into the atmosphere for fear of creating a nuisance, steam alone may be the more desirable stripping agent, since the decomposition products of the acid would be totally absorbed in a neutralizing agent. If it is intended that the sulfur dioxide resulting from the above-described process be utilized by the manufacturer of sulfuric acid, air would be the more desirable stripping agent. The foregoing provides a few examples of what stripping agent is most desirable to meet the needs of particular processes.

The rate of stripping gas flow through the stripper-reactor is also dependent upon a number of factors. The quantity of acid in the sludge and the reactor design, for instance, are factors in determining the optimum gas flow which is required to remove the acid decomposition products. Also, if the stripping gas is to comprise the heat source for the decomposition reaction, the flow rate would obviously exceed that employed in a process in which the sludge is heated by other means. Persons skilled in the art may readily determine the optimum flow for the desired product by considering the various process factors such as those above mentioned.

In Fig. 2, a flow sheet is illustrated which discloses a modified manner in which the sludge-treating process of this invention may be carried out. In Fig. 2, the numeral 40 designates a horizontally disposed reactor tank into which acid sludge may flow by means of the inlet line 42. A battery of sprays 44 may be disposed in the interior of the tank and is in communication with line 42. Sprays 44 are adapted to spray the incoming acid sludge into the large volume of the noncorrosive oil 46 maintained in compartment 48 of the illustrated reactor 40. The noncorrosive oil 46 may be maintained at an elevated temperature by direct firing of the reactor 40 with burner members 50. Stripper gas enters reactor chamber 48 through line 51 and inlets 52 disposed on the bottom of the reactor vessel 40 and forces the sulfuric acid products of decomposition to exit from the vessel 40 through the overhead outlet 54. The acid sludge is continuously introduced into the reactor chamber 48 and continuously moves through baffle means 56 to adjacent reactor chamber 58 which, as illustrated, is of lesser volume than reactor chamber 48. In the latter chamber, flue gas or other stripping gas enters the bottom portion of the chamber through spider members 52a. The latter gas passes through the inlets 52 and 52a at a rate of about 15,000 standard cubic feet per hour. The sulfuric acid products of decomposition which may still remain in the oil contained therein are removed from the chamber 58 through the overhead line 54a. The residual oil and final product emerges from the reactor 40 through line 60 which leads to storage.

The following is a working example of the process diagrammatically illustrated in Fig. 2: Acid sludge containing 89.2 percent hydrocarbon by volume and 10.8 percent of 60 percent sulfuric acid by volume is introduced at the rate of 30 barrels per hour into chamber 48 of reactor 40. The sulfuric acid in the acid sludge upon contacting the hot noncorrosive oil 46 will react therewith and readily decompose into water and sulfur dioxide. The latter products are partially removed from the oil by the stripper gas entering chamber 48 through spider members 52. The oil in chamber 48 is maintained at 450° F. The hydrocarbon substantially devoid of sulfuric acid and sulfuric acid products of decomposition then passes into compartment 58 of reactor 40 wherein any remaining sulfur dioxide and water are removed by the stripping gas. The retention time of the acid sludge in the vessel 40 is fifteen hours, whereafter all the strong acid is decomposed, and the quantity of residual weak acid present in the discharge product emerging through line 60 is less than .1 percent by weight. It is apparent that the arrangement depicted in Fig. 2 requires a substantially longer time for the sludge residence in the reactor in the course of treatment and is thus seen to be inferior, at least from a practical commercial viewpoint to the process outlined in Fig. 1 of the drawing. It is feasible to employ retention times in the stripper reactors of one-half minute to thirty hours. The working example above given with respect to the flow sheet of Fig. 1 employs a retention time of only six minutes and yields a product which is suitable for certain uses, as with asphaltic materials, or as a residual oil for such uses as coking, cracking, etc.

It is thus seen that a method for disposing of acid sludge has been presented which not only solves a heretofore difficult problem in sludge disposal, but, in addition, produces a product having a number of practical commercial uses. As has been above brought out, many modifications may be made in the process which will still remain within the ambit of the inventive concepts disclosed. Although the preferred decomposition temperature is 450° F. any temperature within the range of about 300° to 750° F. may be employed. The reaction times of the product in the reactor are dependent upon the use which will be made of the final product. The longer the reaction time the smaller the percentage of acid in the final product. Obviously the time of reaction will be dependent upon the temperature utilized as well as the acid content of the sludge. Although the strong acid is immediately decomposed, the weak acid content of the acid sludge material in the provided process is destroyed with some difficulty. It is intended, therefore, that this invention be limited only by the scope of the appended claims.

What is claimed is:

1. In a method for processing sulfuric acid sludge which has previously been unprocessed for removal of substantial acid values, the steps comprising admixing said sulfuric acid sludge with a larger volume of noncorrosive hydrocarbon maintained at a temperature sufficiently elevated to substantially instantaneously decompose the acid values in said sludge and passing a stripping gas through the resulting mixture.

2. In a method for processing sulfuric acid sludge which has previously been unprocessed for removal of substantial acid values, the steps comprising admixing said sulfuric acid sludge with a larger volume of noncorrosive hydrocarbon maintained at a temperature sufficiently elevated to substantially instantaneously decompose the acid values in said sludge in a reaction zone, continuously removing a portion of said sulfuric acid-depleted sludge and hydrocarbon mixture from said reaction zone, cycling a first portion of the mixture removed to storage, and recycling a second portion of said mixture removed to said reaction zone for admixture with more sulfuric acid sludge continuously fed into said reaction zone.

3. In a method for processing sulfuric acid sludge which has previously been unprocessed for removal of substantial acid values, the steps comprising admixing said sulfuric acid sludge with a large volume of noncorrosive hydrocarbon maintained at a temperature sufficiently elevated to substantially instantaneously decompose the acid values in said sludge in a reaction zone, passing a stripping gas through said sludge-hydrocarbon mixture whereby the decomposition products of sulfuric acid values may be removed from said reaction zone, continuously removing a portion of said sulfuric acid-depleted sludge and hydrocarbon mixture from said reaction zone, cycling a first portion of the mixture removed to storage, and heating a second portion of said mixture prior to recycling the same to said reaction zone, for admixture with more sulfuric acid sludge continuously fed into said reaction zone.

4. In a continuous method for processing sulfuric acid sludge which has previously been unprocessed for removal of substantial acid values, the steps comprising continuously admixing said sulfuric acid sludge with a larger volume of noncorrosive hydrocarbon in a reaction zone at a temperature sufficiently elevated to substantially instantaneously decompose the acid values in said sludge, continuously removing a portion of said resulting sulfuric acid-depleted sludge noncorrosive hydrocarbon mixture fram said reaction zone, continuously cycling a first portion of said resulting mixture to storage and continuously recycling a second portion of said resulting mixture to said reaction zone.

5. The method as recited in claim 1 in which the temperature of said reaction zone is preferably within the range of between about 400–600° F.

6. In a method for processing sulfuric acid sludge which has previously been unprocessed for removal of substantial acid values the steps comprising continuously introducing sulfuric acid sludge into a reaction zone containing a larger volume of noncorrosive hydrocarbon maintained at an elevated temperature of between about 450° and 600° F., whereby the sulfuric acid values in said acid sludge are substantially simultaneously decomposed into water and sulfur dioxide, and passing an inert gas through said resulting mixture whereby the sulfur dioxide is withdrawn overhead.

7. In a method for processing sulfuric acid sludge which has previously been unprocessed for removal of substantial acid values, the steps comprising continuously introducing sulfuric acid sludge into a first reaction zone containing a larger volume of noncorrosive hydrocarbon maintained at an elevated temperature of between about 450° and 600° F. whereby the sulfuric acid values in said acid sludge are substantially simultaneously decomposed into water and sulfur dioxide upon contacting said hydrocarbon, passing a stripping gas through said resulting mixture whereby sulfur dioxide is withdrawn overhead, passing a portion of said resulting mixture into a second reaction zone and passing an inert gas through said resulting mixture whereby additional sulfur dioxide is withdrawn overhead.

8. In a method for processing sulfuric acid sludge which has previously been unprocessed for removal of substantial acid values, the steps comprising continuously introducing sulfuric acid sludge at a rate of about 30 barrels per hour into a first reaction zone containing about 350 barrels of a noncorrosive hydrocarbon maintained at a temperature sufficiently elevated to substantially instantaneously decompose the acid values in said sludge, and passing a stripping gas through said resulting mixture whereby sulfur dioxide is withdrawn overhead with said stripping gas.

9. In a method for processing sulfuric acid sludge which has previously been unprocessed for removal of substantial acid values, the steps comprising continuously introducing sulfuric acid sludge into a reaction zone containing a larger volume of noncorrosive hydrocarbon maintained at an elevated temperature of between about 450° and 600° F., whereby the sulfuric acid values in said acid sludge are substantially simultaneously decomposed into water and sulfur dioxide upon contacting said hydrocarbon, passing a stripping gas through said resulting mixture whereby sulfur dioxide is withdrawn overhead, passing said resulting stripped mixture from said reaction zone, cycling said stripped mixture to storage.

10. In a method for processing sulfuric acid sludge which has previously been unprocessed for removal of substantial acid values, the steps comprising continuously introducing sulfuric acid sludge into a reaction zone at the rate of about 30 barrels per hour, said reaction zone containing about 350 barrels of a noncorrosive hydrocarbon maintained at a temperature sufficiently elevated to substantially instantaneously decompose the acid values in said sludge, upon contacting said hydrocarbon, passing a stripping gas through said resulting mixture whereby the sulfur dioxide may be removed overhead, continuously passing the resulting mixture into a second reaction zone containing about 100 barrels of a noncorrosive hydrocarbon maintained at an elevated temperature, and passing a stripping gas through the resulting mixture whereby additional sulfur dioxide may be removed overhead.

11. In a method for processing sulfuric acid sludge which has previously been unprocessed for removal of substantial acid values, the steps comprising passing sulfuric acid sludge at the rate of about 30 barrels per hour into the top of a reaction zone, said zone containing a larger volume of noncorrosive hydrocarbon maintained at a temperature sufficiently elevated to substantially instantaneously decompose the acid values in said sludge upon mixing of said noncorrosive hydrocarbon and said sludge, passing the resulting mixture from said reaction zone, heating a portion of said withdrawn mixture and returning said heated portion to said reaction zone adjacent the point of introduction of said sludge thereinto.

12. The method as recited in claim 11 in which said returned mixture is heated to a temperature of about 550° F. prior to return of the same to said reaction zone.

13. In a method for processing sulfuric acid sludge which has previously been unprocessed for removal of substantial acid values, the improvement comprising admixing said sulfuric acid sludge with a larger volume of noncorrosive hydrocarbon maintained at a temperature between about 300–750° F., whereby said acid values contained in said sludge are substantially instantaneously decomposed.

References Cited in the file of this patent
UNITED STATES PATENTS

| | | |
|---|---|---|
| 2,014,556 | Chewning et al. | Sept. 17, 1935 |
| 2,078,882 | Savage | Apr. 27, 1937 |

UNITED STATES PATENT OFFICE
CERTIFICATION OF CORRECTION

Patent No. 2,965,558                                      December 20, 1960

Victor L. Brant

It is hereby certified that error appears in the above numbered patent requiring correction and that the said Letters Patent should read as corrected below.

Column 6, line 23, for "large" read -- larger --; line 46, for "fram" read -- from --.

Signed and sealed this 16th day of May 1961.

(SEAL)
Attest:

ERNEST W. SWIDER
Attesting Officer

DAVID L. LADD
Commissioner of Patents